March 22, 1966 G. P. STOUT 3,242,320
PRODUCTION LINE EVALUATION SYSTEM
Filed Feb. 9, 1962 6 Sheets-Sheet 1

INVENTOR
GEORGE PHILIP STOUT

BY Mead, Browne, Schuyler, & Beveridge

ATTORNEYS.

March 22, 1966 G. P. STOUT 3,242,320
PRODUCTION LINE EVALUATION SYSTEM
Filed Feb. 9, 1962 6 Sheets-Sheet 2

INVENTOR
GEORGE PHILIP STOUT

BY *Mead, Browne, Schuyler, & Beveridge*

ATTORNEYS.

March 22, 1966 G. P. STOUT 3,242,320
PRODUCTION LINE EVALUATION SYSTEM
Filed Feb. 9, 1962 6 Sheets-Sheet 3
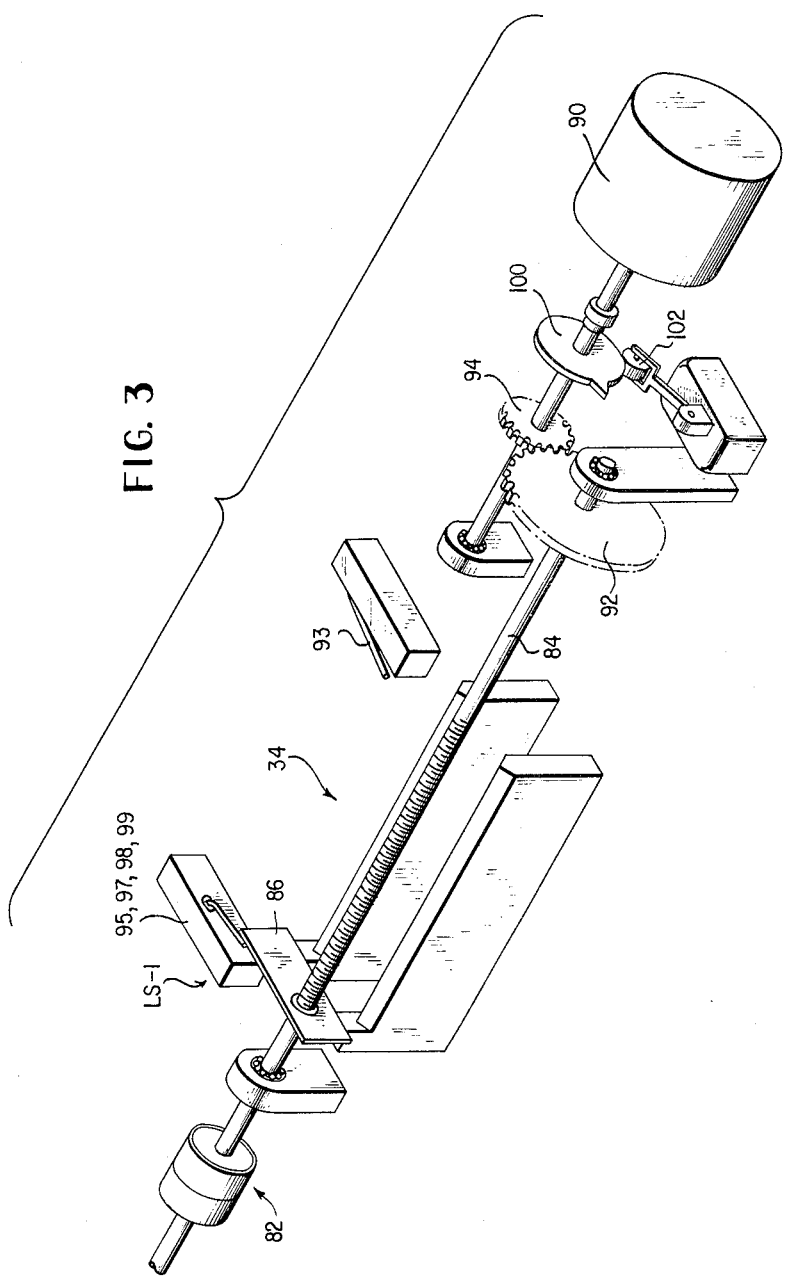
*INVENTOR.*
GEORGE PHILIP STOUT
BY
Mead, Browne, Schuyler, & Beveridge
*ATTORNEYS.*

March 22, 1966 G. P. STOUT 3,242,320
PRODUCTION LINE EVALUATION SYSTEM
Filed Feb. 9, 1962 6 Sheets-Sheet 4

INVENTOR
GEORGE PHILIP STOUT

BY Mead, Browne, Schuyler, & Beveridge
ATTORNEYS.

March 22, 1966  G. P. STOUT  3,242,320
PRODUCTION LINE EVALUATION SYSTEM
Filed Feb. 9, 1962  6 Sheets-Sheet 5

INVENTOR.
GEORGE PHILIP STOUT
BY Mead, Browne, Schuyler, & Beveridge
ATTORNEYS.

March 22, 1966  G. P. STOUT  3,242,320
PRODUCTION LINE EVALUATION SYSTEM
Filed Feb. 9, 1962  6 Sheets-Sheet 6
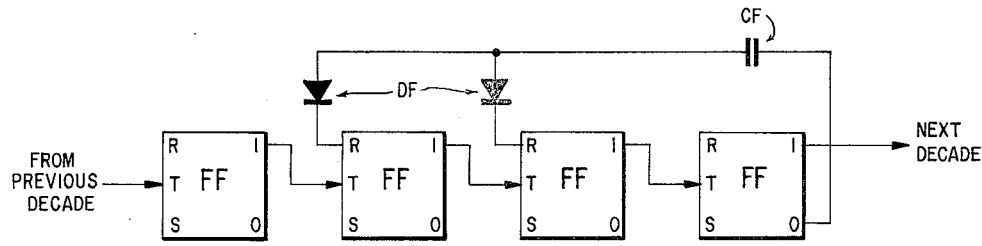
FIG. 7  ONE DECADE OF DECADE COUNTER
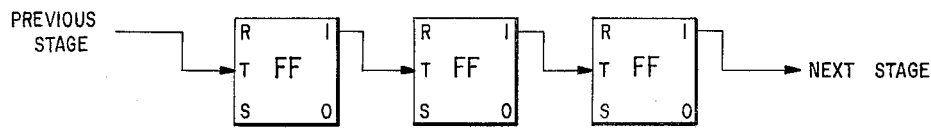
FIG. 8  BINARY COUNTER (3 STAGES)
FIG. 9
BASIC FLIP
FLOP CIRCUIT
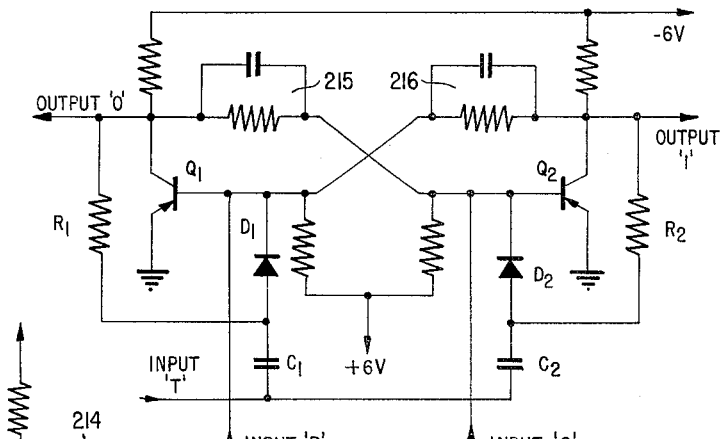
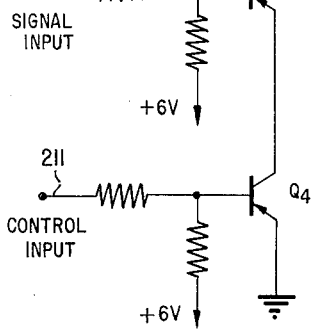
FIG. 10
GATE CIRCUIT
INVENTOR.
GEORGE PHILIP STOUT
BY
Mead, Browne, Schuyler, & Beveridge
ATTORNEYS.

3,242,320
PRODUCTION LINE EVALUATION SYSTEM
George Philip Stout, P.O. Box 4568, Baltimore, Md.
Filed Feb. 9, 1962, Ser. No. 172,347
14 Claims. (Cl. 235—92)

This invention relates to apparatus for evaluating production efficiency, and more particularly to a system for evaluating the efficiency of a production line.

One of the most important factors in the growth of American industry has been development of production line techniques which permit the mass production of many products. The production line is a series operation which involves a number of sequential operations to produce the end product. An unfortunate characteristic of the production line is the fact that a breakdown in any one of the series of operations results in a shutdown of the whole line. In many production line type of operations, it is almost as expensive to have the line stand idle as for the plant to be running at full capacity. In the interest of greater efficiency of operation, it is desirable to maintain close control of the production line operation and for the management to be cognizant of the causes of shutdowns or outages in order that proper steps may be taken to correct the causes of the shutdowns.

However, it frequently happens that in a production line involving a number of different sequential machines and operations that management is not altogether aware of the contributory factors causing the various outages. A good example of this is the situation which exists in a large bottling plant for non-alcoholic carbonated beverages. Assume that the plant has five production lines, each of which has a capacity of 100,000 bottles per day. Assume further that each production line involves thirteen operations or machines, the failure of any one of which could shut the line down. At the end of a day's run, the average production of the five lines may be 65,000 bottles per line instead of 100,000 bottles per line. However, it is impractical for management to keep close tab on the operational environment of 65 machines, and hence the management is not fully aware of the reasons why the actual production fell far short of the potential production. A similar problem exists in any production line operation, whether the production line is for the assembly of radio receivers, automobiles, or any other activity in which a production line technique is used.

Accordingly, it is an object of this invention to provide a system for indicating and recording the efficiency of a production line operation.

It is another object of this invention to provide an apparatus which permits management to keep close control over the efficiency of a production line operation.

It is still another object of this invention to provide an apparatus for indicating and recording the actual production of a production line as compared to the potential production of the line.

It is still a further object of this invention to provide an apparatus which evaluates the total production loss due to shutdowns or outages of the production line and which permits allocation of these losses to the machine or operation causing the production loss.

In achievement of these objectives, there is provided in accordance with this invention a counting means which indicates the potential production of a production line. This counting means includes a "rate memory" device in the form of a variable speed motor which operates a counting register and which is driven in synchronization with the output of a "master" machine of the system whose rate is indicative of the production rate of the system. A differential device is provided for correcting the speed of the variable speed rate memory motor in accordance with changes in speed of the master machine. Upon shutdown of the master machine due to a shutdown in the production line, the variable speed rate memory motor continues operation at the last-established rate to thereby continue indicating on the register device the potential production of the production line. Means are provided for connecting the output of the rate memory device to a memory storage device during the shutdown period.

The memory storage device is connected to a plurality of registers, each associated with one of the operations or machines of the production line and, at the end of the shutdown period, a suitable switch may be actuated to cause the memory storage device to "dump" its stored record into the appropriate register to thereby provide a record and indication of the total number of potential production units lost due to the machine or operation which caused the particular shutdown.

The apparatus also includes a counting device to integrate or count the actual production of the master machine, this counting device registering only when the master machine is in actual operation. A comparison circuit is provided to compare actual production with potential production, with input signals being delivered to the comparison circuit which are proportional to actual and potential production. A percentage meter is actuated by the comparison circuit to indicate the ratio of actual to potential production at the end of the work period.

Further objects and advantages of the invention will become apparent from the following description taken in conjunction with the accompanying drawings in which:

FIG. 3 is a schematic diagram of the memory storage device;

FIG. 7 is a block diagram of a typical decade of a decade counter as used in FIG. 6;

FIG. 8 is a block diagram of a three stage binary counter;

FIG. 9 is a wiring diagram of a transistor flip-flop circuit connectable as shown in FIG. 7 or 8 as a decimal or binary counter; and FIG. 10 is a wiring diagram of a gate circuit.

Figure 1:
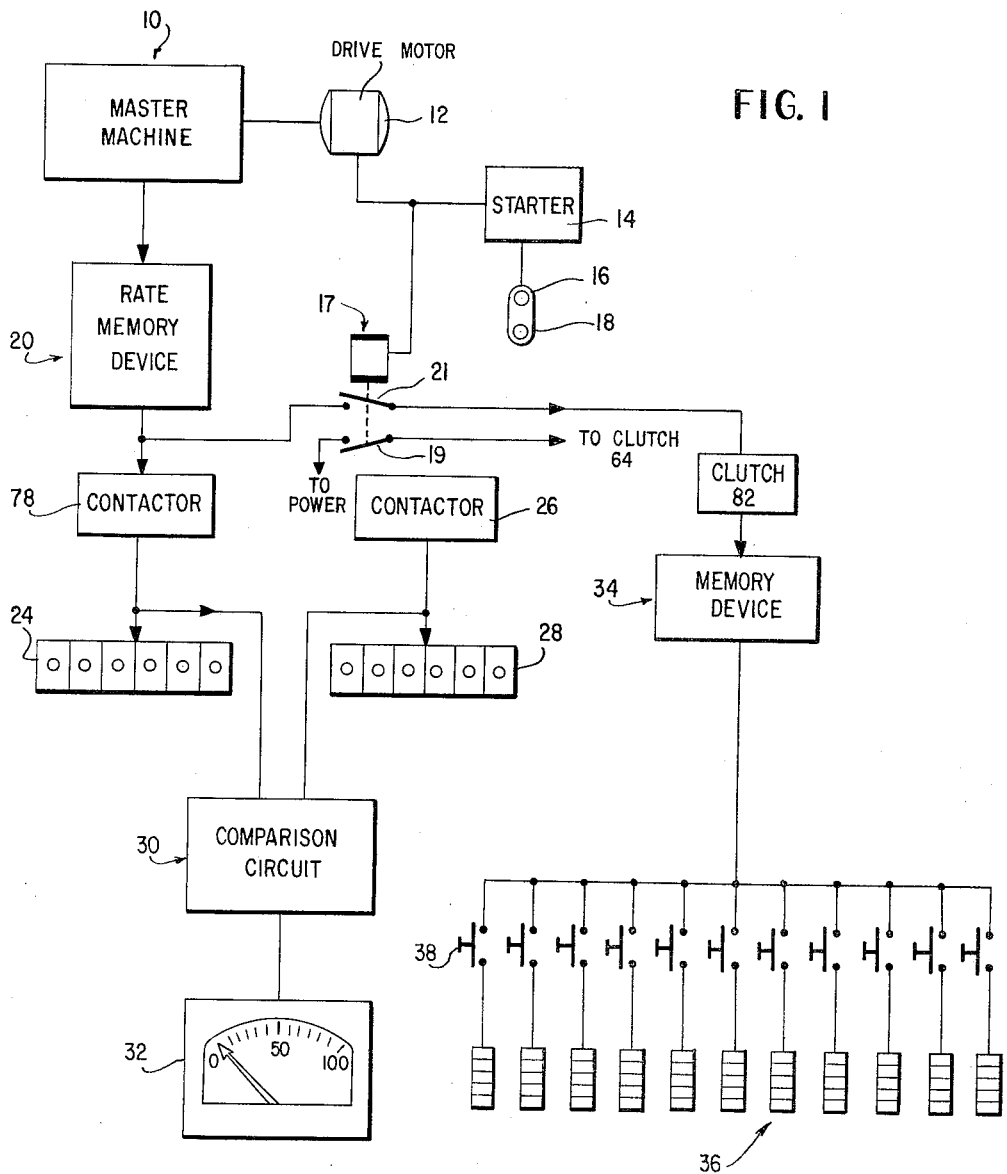
FIG. 1 is a block diagram of the apparatus and system of the invention.

The general arrangement and orientation of the apparatus of the invention will best be understood by reference to the block diagram of FIG. 1 which illustrates one embodiment of the invention as applied to the evaluation of the evaluation of the efficiency of a production line in a bottling plant such as a plant for the bottling of non-alcoholic carbonated beverages.

In any assembly line, one machine, or one operation, becomes the master operation, and each of the succeeding machines enhances or take steps to complete the operation that the master unit has started. Thus, in an automobile plant, the frame that starts through on the first operation determines the number of automobiles that will be produced. In a bottling plant, the unit that fills the bottles with carbonated water is usually the master unit, while each of the other machines progressively completes the process.

Referring now to the block diagram shown in FIG. 1, the master machine which is the filling machine in the bottling process is generally indicated at 10 and is driven by a drive motor 12 through a starting device 14 operated by an "on" pushbutton 16 and an "off" pushbutton 18. A rate memory device generally indicated at 20 and which may be a variable speed motor is driven as a "slave" to master machine 10, with suitable synchronizing means being provided to insure that the rate of operation of the rate memory device is in synchronization with the rate of operation of master machine 10. The rate memory device 20 periodically actuates a contactor 78 which actuates a register 24 in such manner that successive actuations of contactor 78 causes additional units to be counted by register 24. If master machine 10 should shut down for some reason, rate memory device 20 continues to operate at the last-established rate and thus continues to actuate register 24.

If no shutdown of master machine 10 has occurred, the number of units registered on register 24 will correspond to the actual number of operations performed by master machine 10. On the other hand, if a shutdown has occurred, the number of units registered on register 24 due to the operation of rate memory device 20 will be an integration of the actual operations performed by master machine 10 plus the potential operations which might have been performed by machine 10 during the shutdown period. Therefore, the total registration on register 24 is an indication of the total potential operations of master machine 10.

The actual operations of master machine 10 are counted by actuation of contactor 26 and recorded on register 28. The actual production, in the case of a bottling plant production line, would be the number of bottles filled by the master machine.

In order to evaluate the efficiency of the system in percentage terms, an output signal from the rate memory device 20 and also from the actual production counting device 26 are fed into a comparison circuit generally indicated at 30, and the output of the comparison circuit 30 is registered on a percentage meter 32 to indicate the percentage efficiency of the production line based upon the ratio of the actual number of bottles filled by master machine 10 to the potential number of bottles that could have been filled in the given production period.

In order to provide a record of the potential production lost during the periods of shutdown and also to provide a record of the cause of the various shutdowns and of the production loss attributable to the various possible causes of shutdown, the output of the rate memory device 20 is fed to a memory storage device generally indicated at 34 during periods of shutdown of master machine 10. Upon the correction of the cause of shutdown, the stored record on memory storage device 34 may be discharged into any of a plurality of registers or read out devices generally indicated at 36 by the actuation of a switch 38 associated with one of the registers 36. Each register 36 is associated with one of the operations or machines in the production line, and the foreman or other person responsible for the operation of the efficiency evaluation apparatus closes the switch 38 of the register 36 associated with the machine or operation causing the shutdown. Thus, at the end of each shutdown period, the number of potential production units lost due to the particular shutdown is recorded on one of the counting devices 36 to thereby provide a cumulative record for management of the number of production units lost due to shutdown of any particular machine or operation.

Figure 2:
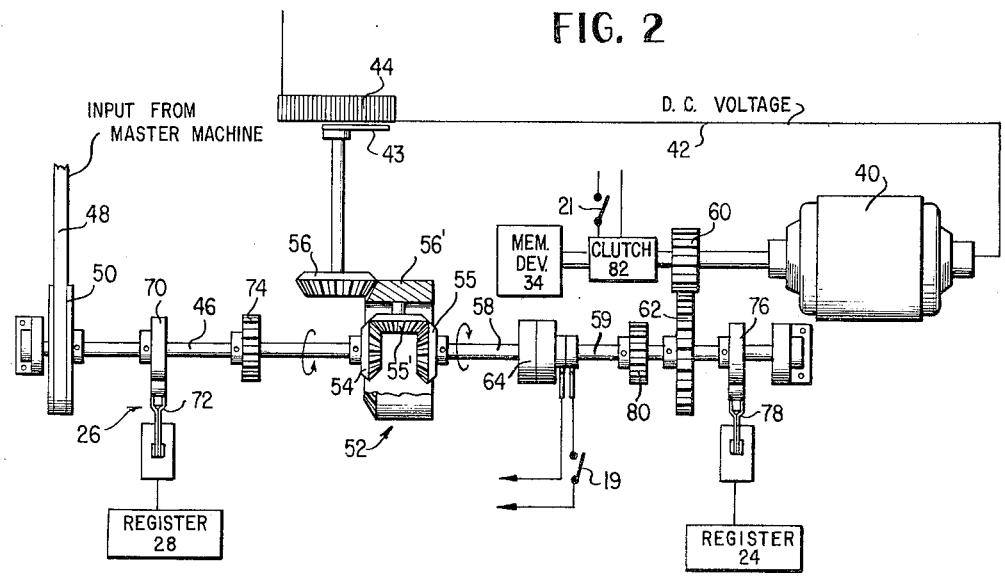
FIG. 2 is a diagram of the memory rate device.

The rate memory device may assume the form shown in FIG. 2. A variable speed electric motor 40 is connected to electrical power through conductor 42 which is connected to movable tap 43 of a potentiometer 44. The speed of variable speed motor 40 is synchronized in accordance with the speed of shaft 46 which is driven from master machine 10 through a drive belt 48 which passes around a pulley 50 on shaft 46. Variable speed motor 40 is maintained in synchronization with the speed of shaft 46 and thus with the speed of master machine 10 through a differential device generally indicated at 52 including input gears 54, 55, pinion gear 54', ring gear 56', and output gear 56. Input gear 54 of the differential device rotates with shaft 46 driven from master machine 10. The other input gear 55 is mounted on shaft section 58 which is coupled to shaft section 59 through magnetic clutch 64. Shaft section 59 is driven by motor 40 through gears 60 and 62. Magnetic clutch 64 is clutched to connect shaft 58 to motor 40 as long as master machine 10 is in operation. Any differential in speed between input shaft 46 and motor 40 causes a rotation of output gear 56 which causes a readjustment of movable tap 43 of potentiometer 44 to thereby readjust the voltage input to motor 40 and, consequently, to readjust the speed of motor 40.

Also mounted on shaft 46 is a cam member 70 which actuates a switch 72 once in each revolution of shaft 46. Switch 72 actuates register 28 which indicates the actual number of bottles filled by master machine 10. A gear 74 is also mounted on shaft 46 and drives a tap-changing device used in connection with the operation of the percentage meter or comparison circuit shown in FIG. 5 as will be described hereinafter. A cam 76 is driven by motor 40 and actuates switch 78 once in each revolution to thereby provide an actuation of register 24 which registers the potential number of operations or filled bottles during the operating period.

A gear 80 is mounted on shaft section 59 driven by motor 40. Gear 80 drives a tap-changing device used in connection with the operation of the percentage meter or comparison circuit shown in FIG. 5, in the same manner as gear 74.

In the operation of the rate memory device shown in FIG. 2, variable speed motor 40 is in constant operation during the work period of the production line. The speed of motor 40 is maintained in synchronization with the rate of operation of master machine 10 through the differential device 52 which corrects the speed of motor 40 in accordance with any changes in the speed of master machine 10. The differential device 52 corrects the speed of motor 40 by readjusting the tap 43 on potentiometer 44 to thereby vary the voltage to motor 40, thereby varying the speed of motor 40. During its synchronous operation, motor 40 drives cam 76 in synchronization with the rate of operation of master machine 10, thereby actuating switch 78 to close an electrical circuit to register 24 in such manner as to change the reading of register 24 in synchronization with the rate of operation of master machine 10.

A relay 17 (FIG. 1) is so connected that its operating coil is energized only when master machine 10 is in operation. Relay 17 controls a normally open contact 19 and a normally closed contact 21. Contact 19 is in the circuit of magnetic clutch 64 which connects shaft sections 58 and 59 to each other and thereby connects motor 40 of rate memory device 20 to differential device 52 (FIG. 2). Contact 21 is in the circuit of magnetic clutch 82 which connects memory rate motor to memory storage device 34 (FIGS. 2 and 3).

If master machine 10 should shut down, relay 17 is de-energized and permits normally open contact 19 in the circuit of clutch 64 to reopen, thereby de-energizing clutch 64 and disconnecting shaft section 59 from shaft section 58, thereby disconnecting motor 40 from differential device 52. Motor 40 continues to rotate at the last-established speed and thereby continues to actuate switch 78 in such manner as to continue to record on register 24 the potential production units during the period of shutdown of master machine 10. When master machine 10 again goes into operation, relay 17 is again energized and causes normally open contact 19 to reclose, thereby energizing clutch 64 and causing the clutch to again connect shaft sections 58 and 59. This once again connects motor 40 to differential device 52 and again subjects motor 40 to the speed-regulating action of differential 52.

Whenever drive motor 12 of master machine 10 discontinues operation during a shutdown period, the de-energization of relay 17 also permits the reclosing of normally closed contact 21 in the circuit of magnetic clutch 82 which connects rate memory device 20 to memory storage device 34. The reclosing of contact 21 energizes magnetic clutch 82 (see FIG. 3) to mechanically connect the output shaft of motor 40 to memory storage device 34.

As best seen in FIG. 3, the memory storage device includes a lead screw 84 which is driven by motor 40. A threaded plate member 86 is in threaded engagement with lead screw 84 and moves linearly along lead screw 84 as the lead screw rotates. The movement of plate 86 along lead screw 84 is a measure of the number of rotations of the lead screw derived from the memory rate motor 40 and is thus an indication of the potential production units lost during the shutdown period. Lead screw 84 is connected to a driven motor 90, which, when energized, serves as the memory "dump," driving lead screw 84 in a reverse direction to that in which it was driven by rate memory motor 40. When master machine 10 again resumes operation, relay 17 is again energized and opens normally closed contact 21 to de-energize magnetic clutch 82. When this occurs, lead screw 84 is disconnected from variable speed motor 40 of rate memory device 20. A limit switch 93 is positioned at the end of the path of linearly movable plate member 86 and is electrically connected in the circuit of clutch 82 in such manner as to open clutch 82 when plate 86 reaches limit switch 93, to thereby protect the apparatus from over-travel. A reset limit switch generally indicated at LS–1 is positioned at the zero position on the path of movement of plate 86. Limit switch LS–1 includes normally closed contacts 95, 97 and 98 which are moved to open position by the presence of plate 86 at its zero position and a normally open contact 99 which moved to closed position by the presence of plate 86 at its zero position. The function of contacts 95, 97, 98 and 99 will be explained later.

At the end of the shutdown period during which plate 86 has moved along lead screw 84 a predetermined distance in accordance with the number of potential production units lost during the shutdown period, memory dump motor 90 is suitably energized as will be described in more detail hereinafter to drive lead screw 84 in a reverse direction to that in which it was driven by rate memory motor 40, the lead screw 84 being rotated by memory dump motor 90 until contact plate 86 reaches the initial position at which it engages contact 98 of limit switch LS–1 to open the circuit of memory dump motor motor 90.

Memory dump motor 90 drives a cam member 100 which actuates a switch 102 once during each revolution of the cam. The number of actuations of switch 102 is a measure of the number of production units lost during the given shutdown period. Switch 102 is connected to one of the registers 36 through one of the switches 38 (FIG. 1) in such manner as to record on one of the registers 36 the number of production units lost during the given shutdown period.

Figure 4:
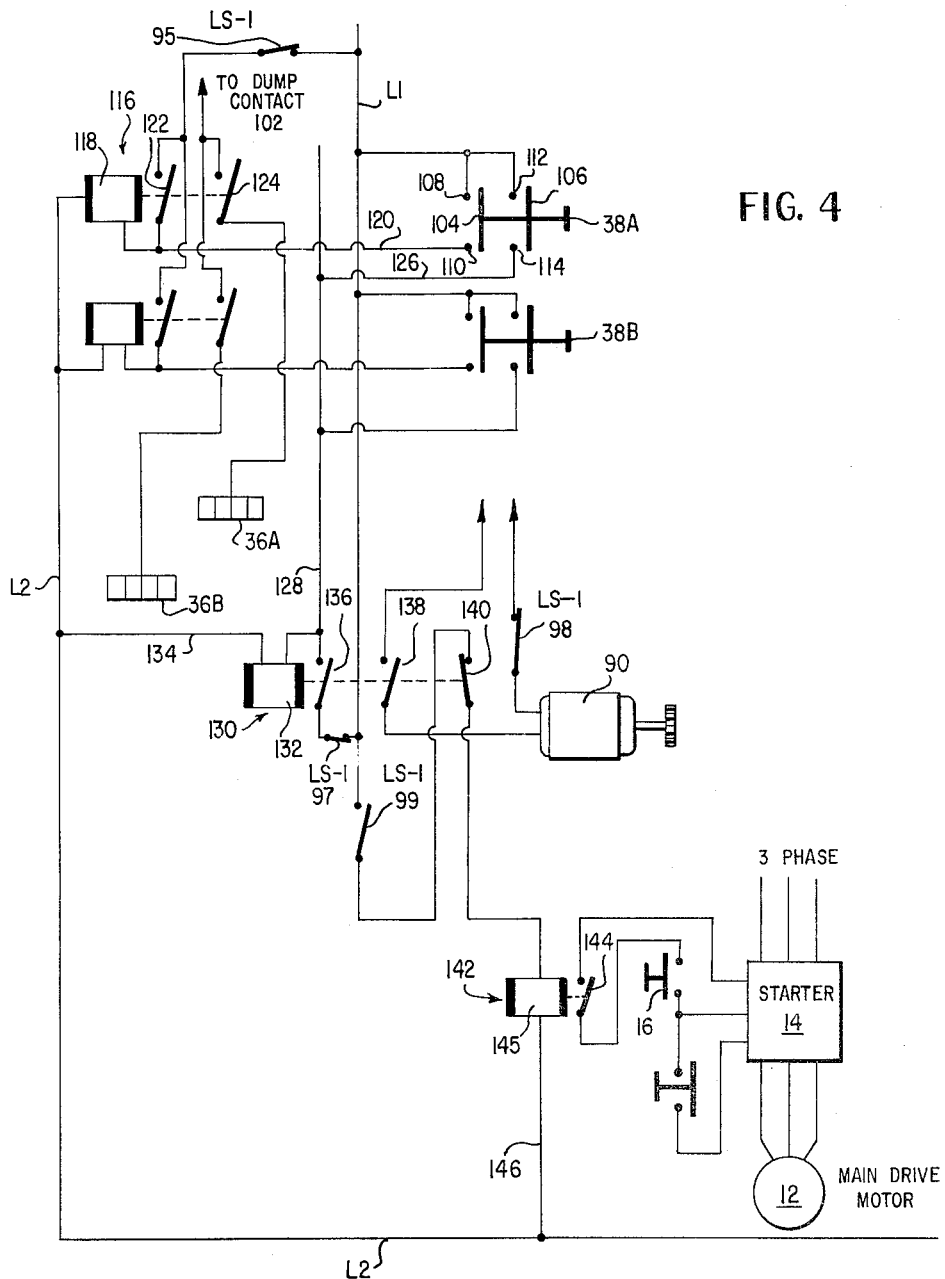
FIG. 4 is a schematic diagram of the electrical circuit arrangement for the memory dump device.

The electrical circuit arrangement which may be used in connection with the memory dump system is schematically shown in FIG. 4.

As previously explained in connection with FIG. 1, a plurality of registers 36 are provided, each corresponding to one of the machines or operations in the production line. Any one of the registers 36 may be selectively connected to the memory storage device 34 by actuation of one of the pushbuttons 38. When this is done, the memory storage units on the memory storage device 34 are "dumped" into the register 36 whose pushbutton 38 was actuated due to the connection of contact 102, operated by memory dump motor 90, into the circuit of the register 36 whose pushbutton 38 is actuated. This produces a record for management to indicate that the particular machine or production operation whose register 36 is connected to memory device 34 is responsible for the loss of the production units stored on memory storage device 34 for the given shutdown.

In the schematic circuit arrangement shown in FIG. 4, two of the registers 36 have been shown together with two of their respective pushbutton actuators. These registers have been designated as 36A and 36B, respectively, while their associated pushbutton switches have been indicated as 38A and 38B.

As will be seen in FIG. 4, pushbutton switch 38A which controls the connection of register 36A to the memory device 34 includes a first bridging contact 104 and a second bridging contact 106. Bridging contact 104 is adapted to bridge fixed contacts 108 and 110. Similarly, bridging contact 106 is adapted to bridge fixed contacts 112 and 114. When bridging contact 104 bridges fixed contacts 108 and 110, operating coil 118 of a relay generally indicated at 116 is energized as follows: from power line L–1 through fixed contact 108, bridging contact 104, fixed contact 110, through conductor 120 to one side of operating coil 118, through operating coil 118 to power line L–2. Relay 118 controls two normally open contacts 122 and 124. Closing of contact 122 completes a holding circuit for relay coil 118. The holding circuit for coil 118 also includes normally closed contact 95 of limit switch LS–1 which is actuated by plate 86 at its zero position on lead screw 84. Contact 95 is normally closed but is actuated to open position by the presence of plate 86 at its zero position. Contact 124 is in series with dump contact 102 of memory dump motor 90 and its closure completes an electrical circuit to register 36A in series with dump contact 102.

The bridging of fixed contacts 112 and 114 by bridging contact 106 of pushbutton switch 38A simultaneously completes a circuit which results in the energization of dump motor 90 as follows: from power line L–1 through fixed contact 112, through bridging contact 106, through fixed contact 114, through conductor 126, to conductor 128, to operating coil 132 of a relay generally indicated at 130, and thence through conductor 134 to power line L–2. Operating coil 132 is energized through the completion of the circuit just described. Operating coil 132 controls normally open contacts 136 and 138 and normally closed contact 140. Contact 136 completes a holding circuit for operating coil 132 to maintain coil 132 energized after pushbutton switch 38A is released to open position. The holding circuit for coil 132 also includes a normally closed contact 97 of limit switch LS–1, located at the zero position of plate 86 on lead screw 84. Contact 97 is open only when plate 86 is at its zero position. Contact 138 is closed by operating coil 130 to complete the energization circuit of dump motor 90 and to cause dump motor 90 to start turning in such manner as to actuate dump contact 102. In turning, dump motor 90 causes the rotation of lead screw 84 and causes movement of threaded plate 86 in a reverse direction to that in which it was moved by rate memory motor 40.

Each of the other registers 36, such as register 36B, and their associated pushbuttons operate in the same manner as that just described for register 36A and its associated pushbutton 38A.

Since the main drive motor 12 which drives master machine 10 should not again start its operation until memory storage device 34 has been unloaded or completely dumped, the starting circuit of main drive motor 12 is interlocked with the memory storage device 34 as shown in FIG. 4. The starting circuit of starter 14 is controlled through a pushbutton 16 in series with a normally open contact 144 of a relay generally indicated at 142. Contact 144 is moved to closed position when operating coil 145 of relay 142 is energized. One side of operating coil 145 is connected to power line L–2 through conductor 146. The other side of operating coil 145 is connected to power line L–1 in series with normally closed contact 140 of relay 130 and also in series with normally open contact 99 of limit switch LS–1 located at the zero position of movable plate 86 of memory storage device 34. Normally closed contact 140 is open whenever relay 130 is energized in response to operation of pushbutton switch 38, and thus is open whenever dump motor 90 is in operation to dump the stored units on memory storage device 34 to one of the registers 36. Furthermore, contact 99 of limit switch LS–1 is closed only when movable plate 86 of the memory device is in its zero position in which it engages limit switch LS–1 and moves contact 99 to closed position. Thus, the main drive motor 12 can be energized only if the following conditions are both met: (1) dump motor 90 must not be in operation; and (2) threaded plate 86 must be in its zero position.

Figure 5:
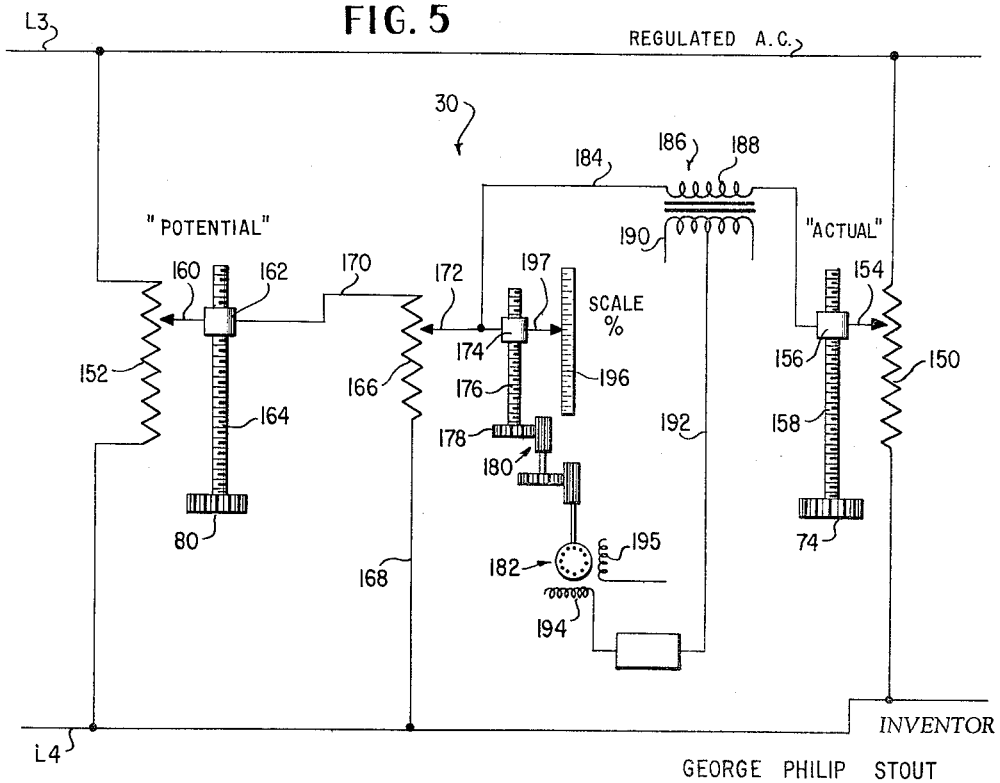
FIG. 5 is a schematic diagram of the percentage meter or comparison circuit.

The comparison circuit generally indicated at 30 in FIG. 1 is shown in detail in FIG. 5. The comparison circuit includes a first voltage divider 150 connected across power lines L–3 and L–4 which are connected to a source of regulated A.C. voltage. A second voltage divider 152 is also connected across power lines L–3 and L–4. A tap 154 is carried by a threaded bushing 156 which moves linearly along shaft 158 when gear 74 attached to shaft 46 is rotated. With reference to FIG. 2, it will be seen that gear 74 is mounted on shaft 46 and rotates in accordance with the actual rate of operation of master machine 10. A similar tap 160 is linearly movable along voltage divider 152 when threaded bushing 162 moves along threaded shaft 164 due to the rotation of gear 80 carried by shaft section 59. As will be seen in FIG. 2, gear 80 is mounted on shaft section 59 and is driven in accordance with the rotation of rate memory motor 40. Thus, the position of tap 154 along voltage divider 150 depends upon the actual operations of master machine 10 while the position of tap 160 along voltage divider 152 depends upon the potential operations of master machine 10, as determined by rate memory motor 40.

A third voltage divider 166 is connected at one end directly to power line L–4 by conductor 168 while the other side of voltage divider 166 is connected through conductor 170 to tap 160 and thus to a variable point on the voltage divider 152 in accordance with the position of tap 160. A tap 172 is movable along voltage divider 166 and is connected to a threaded bushing 174 which is linearly movable along a threaded shaft 176. A gear 178 is rigidly attached to an end of shaft 176 and is engageable with a gear train generally indicated at 180 which is driven by a motor 182. Tap 172 is electrically connected to tap 154 through a conductor 184 in series with the primary winding 188 of a transformer generally indicated at 186. Transformer 186 includes a secondary winding 190 which is connected by conductor 192 to a control or field winding 194 on motor 182. Motor 182 also has a reference winding 195 having a magnetic field with which the field of control winding 194 reacts.

It will be seen that the comparison circuit hereinbefore described is essentially a Wheatstone bridge in which any differences in the potential of tap 154 on voltage divider 150, relative to the potential of tap 160 on voltage 152 causes current flow through primary winding 188 of transformer 186. Current flow through winding 188 causes a flow of current through secondary winding 190, thereby causing a current flow in field or control winding 194 of motor 182. This causes motor 182 to rotate to readjust the position of threaded bushing 174 on threaded shaft 176. The movement of bushing 174 adjusts the position of pointer 197 relative to the indicator scale 196 to indicate the percentage of actual production to potential production, based upon a work day of a predetermined number of hours. The reading of pointer 197 reflects the production percentage at any given minute. At the same time, the movement of bushing 174 on shaft 176 adjusts the position of tap 172 with respect to voltage divider 166. The movement of tap 172 on voltage divider 166 inserts an opposition voltage in series with the voltage across transformer primary winding 188 to cause a cessation of current flow through winding 188 and thereby rebalance motor 182 at its new position.

*Summary of operation of the embodiment of FIG. 1*

Assume that the production line is in operation and that drive motor 12 is operating master machine 10. Rate memory motor 40 is energized and drives cam 76 to periodically close switch 78 to cause the actuation of register 24. Rate memory motor 40 derives its power through conductor 42 which is connected to movable tap 43 on potentiometer 44. The rate of operation of motor 40 is synchronized with the rate of operation of master machine 10 through synchronizing device 52. Synchronizing device 52 has gears 54 and 55 which are respectively driven in accordance with the rate of rotation of master machine 10 and of rate memory motor 40 and any differential in speed of these members causes rotation of gear 56 to readjust the position of tap 43 on potentiometer 44, thereby readjusting the speed of motor 40.

While master machine 10 continues to operate, shaft 46 drives cam 70 to close switch 72, to thereby record the actual production on register 28.

If a breakdown or outage occurs in the production line and master machine 10 comes to a stop, rate memory motor 40 continues operation and continues to record on register 24 through the actuation of contact 78. The registrations on register 24 which occur after the stoppage of machine 10 are a recordation of potential units that might have been produced during the period of stoppage.

Simultaneously with the stoppage of master machine 10, clutch 82 (FIG. 3) is actuated by the closure of contact 21 to connect rate memory motor 40 in driving relation to lead screw 84 of the memory storage device generally indicated at 34. Rate memory motor 40 rotates lead screw 84 and causes threaded plate member 86 to advance along lead screw 84 to a position determined by the number of rotations of the lead screw. Shaft 84 is connected through gears 92 and 94 to a drive motor 90 which subsequently "dumps" the stored intelligence of memory storage device 34 into any one of the plurality of registers 36 which correspond to different machines or operations of the production line.

After the outage of the production line has stopped and when the production line is about ready to start again, the foreman or other person responsible for the operation of the production evaluation apparatus actuates one of the pushbuttons 38 associated with one of the registers 36. Thus, for example, referring to FIG. 4, if it is desired to dump the stored intelligence of memory storage device 34 into register 36A, pushbutton 38A is actuated. This results in the energization of operating coil 118 of relay 116 and closes contact 124 in series with dump contact 102 operated by motor 90 to thereby connect contact 102 into the electrical actuation circuit of register 36A. Actuation of pushbutton 38A also energizes operating coil 132 of relay 130 to close contact 138 in the circuit of memory dump motor 90. Memory dump motor 90 therefore starts to turn to rotate lead screw 84 of the memory storage device 34 in a reverse direction to that in which it was rotated by rate memory motor 40. This causes threaded plate 86 to advance linearly from the position to which it was advanced by rate memory motor 40 back to its starting position in which it engages limit switch LS–1. Actuation of limit switch LS–1 opens normally closed contact 98 of the limit switch, thereby opening the circuit of dump motor 90. Dump motor 90 therefore stops rotating lead screw 84. Actuation of limit switch LS–1 by the arrival of plate 86 at the zero position also opens normally closed limit switch contacts 95 and 97 to open the holding circuits of relays 116 and 130 and closes normally open contact 99 of the limit switch which is interlocked with the starting circuit of main drive motor 12.

The rewinding operation performed by dump motor 90 causes an actuation of dump contact 102 once for each revolution of the dump motor, thereby closing the actuation circuit of register 36A through contact 124 a number of times which is a measure of the production units lost during the given outage for which the machine or operation corresponding to register 36A was responsible.

To prevent starting of main drive motor 12 of master machine 10 while dump motor 90 is in operation or when plate 86 on lead screw 84 is away from its zero position, an interlock circuit is provided which insures proper coordination between the factors just mentioned and the starting operation of drive motor 12. The energization circuit of operating coil 145 of relay 142 which controls contact 144 in the starting circuit of motor 12 includes a normally closed contact 140 which is moved to open position whenever dump motor 90 is in operation, and also includes normally open contact 99 of limit switch LS-1 which is moved to closed position only when plate 86 is in its zero position on lead screw 84. Thus, the starting device 14 is not effective to start main drive motor 12 of master machine 10 unless the following conditions are met: (1) Dump motor 90 is not in operation; and (2) plate 86 is at its zero position at lead screw 84.

*Electronic embodiment of the invention*

Figure 6:
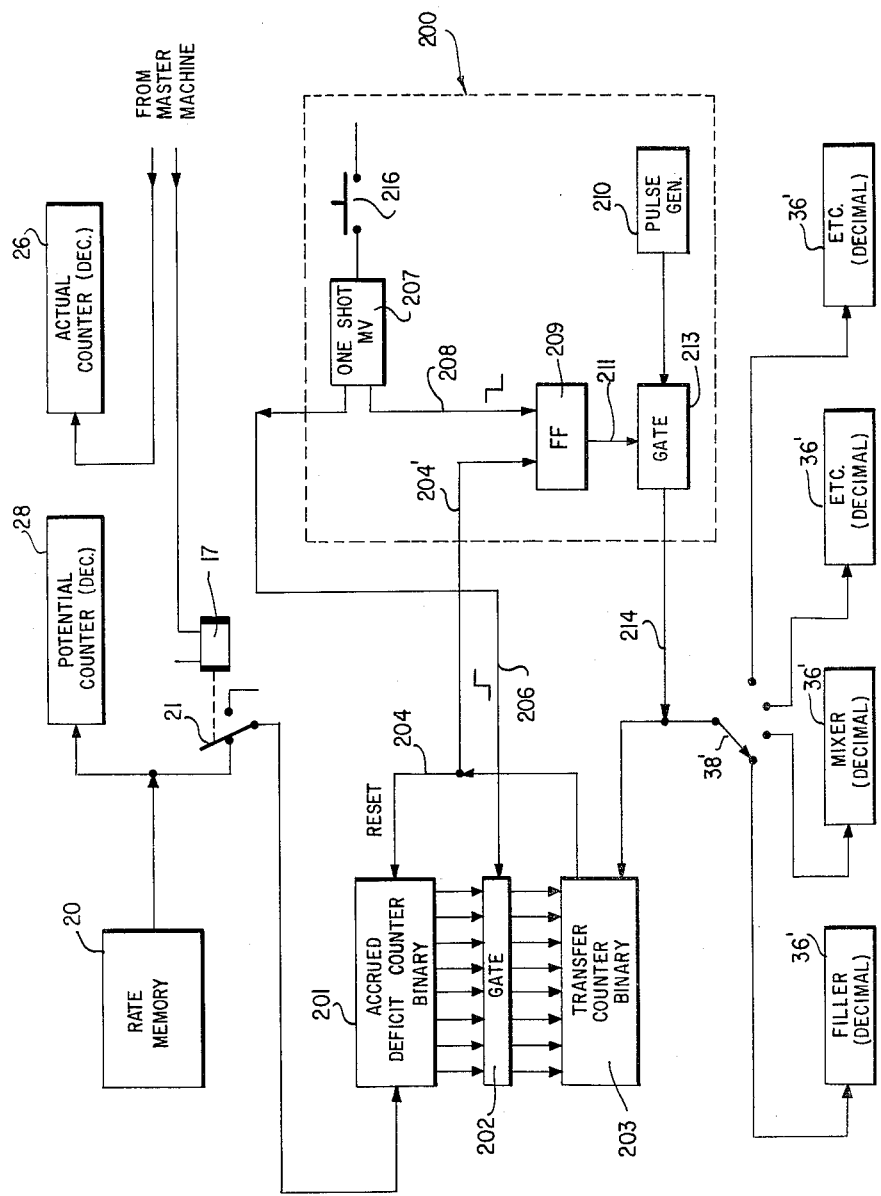
FIG. 6 is a block diagram of second embodiment of the invention.

As described hereinabove, the production line evaluation system diagrammatically illustrated in FIG. 1 employs electromechanical counting and conversion devices. However, as will become apparent, the invention is not limited to electromechanical counting and conversion devices, but may employ all electronic devices for determining the efficiency of the production line. With reference to FIG. 6, devices or units which are similar or identical to devices shown in FIG. 1 and are identified by the same numerals while the devices which have a direct corresponding part but are all electronic are identified by the same numerals primed.

Relay 17 is connected in parallel with drive motor 12 shown in FIG. 1 so that as long as the drive motor is energized, relay 17 is energized to hold switch 21 in the open position. Similarly, the "actual" counter device 26' receives an input for each unit operation of the master machine and thus counts each unit actually produced by the master machine while it is in operation. Likewise, the rate memory device 20 is identical to the rate memory device 20 shown in FIG. 1 and operates in substantially identical fashion to produce output pulses on line 199, which pulses occur at a rate corresponding to the rate at which the production units were passing through the master machine. Thus, as the speed of the "master" machine varies, the rate of pulses on line 199 likewise varies and in a directly proportional amount. Therefore, as long as there are no shutdowns, the count registered in "potential" counter 28' will be identical with the count registered in "actual" counter 26'. The "potential" counter 28' and "actual" counter 26' are electronic decade counters which are described more fully hereinafter. Each pulse from the rate memory device 20 represents a unit of production and as long as relay 17 is energized, switch 21 is held open so that only "potential" counter 28' counts these pulses. When the "master" machine has shut down for any cause whatsoever, relay 17 is de-energized and switch 21 completes a circuit from the rate memory device 20 to the "accrued deficit" counter 201 so that the pulses from the rate memory device 20 are applied both to the "potential" counter 28' and to the "accrued deficit" counter 201.

Accrued deficit counter 201 may be a conventional binary counter composed of a plurality of cascaded binary or flip-flop circuits such as shown in FIG. 8. The binary counter circuit shown in FIG. 8 is shown as having only three flip-flop stages. However, the number of flip-flop stages in the counter is considerably more than the three stages shown and may be varied to suit the requirements of the particular installation. Preferably, the number of stages should be large enough so that the total count possible is large enough to accommodate all of the pulses from the rate memory device 20 for as long a time that relay 17 is de-energized. In a bottling plant, for example, the number of binary stages in the counter could be about 18 stages so that the total count storable in the counter would be 262,143 ($2^n-1$).

Each individual stage of the accrued deficit counter 201 is coupled through a gate 202 to a transfer counter 203, which is identical to the accrued deficit counter 201, and has a maximum count equal to the maximum count of the accrued deficit counter 201. However, the connections between the accrued deficit counter and the transfer counter are such that each corresponding stage in the transfer counter exhibits a condition which is the reverse of the condition of each stage of the accrued deficit counter 201. For example, consider a 5-stage accrued deficit counter which has counted to the number $$OXXOO \ (=6 \text{ counts})$$

Reversing all bits by transferring to the transfer counter 203, each stage of the transfer counter would exhibit a count of $$XOOXX \ (=25 \text{ counts})$$

Thus, in the above-discussed example, where a 5-stage counter has a maximum count of 31 ($2^n-1$) the number of additional pulses which the transfer counter can count before it transfers a reset pulse would be $$6 \ (2^n-1)-A=\overline{A}$$

where A equals the number of counts stored in counter 201, $n$ equals the number of binary stages in the counter and $\overline{A}$ equals the complement of the count stored in counter 201. The transfer of the complement $\overline{A}$ of the number A stored in counter 201 to the transfer counter 203 is controlled by a programmer 200.

As thus far described, the accrued deficit counter 200 merely counts the pulses from the rate memory device 20 and stores or memorizes the total count of units of lost production. As previously explained in connection with FIG. 1, one of a plurality of registers or counters 36', each corresponding to one of the machines or operations in the production line, is energized according to the position of switch 38'. Switch 38' thus selectively connects the storage circuit to the counter corresponding to the machine or operation which caused the shutdown. Switch 38' may be manually actuated either at the machine or operation responsible for the shutdown or from a central location if the cause of the shutdown is known at the central location.

Each counter or register 26' in the embodiment shown in FIG. 6 is a decimal type counter comprising a series of flip-flops connected such as shown in FIG. 7, there being as many of the decade counters shown in FIG. 7 as the number of significant digits desired, with a read-out device (not shown) associated with each such counter. Conventionally, the flip-flops shown in the decade counter are cascaded with the feedback arrangement shown through capacitor $C_F$ and diodes $D_F$ to effect decimal counting. These counters are identical to the potential counter 28' as well as the actual counter 26'.

The actual transfer of the complement of the count stored in counter 201 to the transfer counter 203, as well as the conversion of the count stored in the transfer counter 203 to a decimal count is accomplished by the programmer 200. The programmer 200 includes an energizing switch 214 which connects a trigger voltage source (not shown) to a one shot multivibrator 207. One shot multivibrator 207 produces an output pulse having a time duration of about one millisecond. The leading edge of this pulse is applied to the gate circuit 202 to open this gate and allow the complement of the number of counts stored in accrued deficit counter 201 to appear in transfer counter 203, as described above. Gate 202 is not shown in detail but may be two biased diodes per counter stage or any other suitable multiple gate circuit which, when opened by the leading edge of the pulse produced by one shot multivibrator 207, is effective to cause transfer counter 203 to register the complement of the count stored in accrued deficit counter 201.

As noted earlier, the maximum count of which counter 203 is capable, less the complement of the count stored in this counter is equal to the total count stored in deficit counter 201. Therefore, the number of pulses required to fill the transfer counter 203 equals the total number of production units lost during any given period of shutdown. These pulses are supplied from a pulse generator 210. The frequency of the pulse generator preferably lies between 50 kc. and 100 kc. The frequency of the pulse generator determines the time period it takes to fill up the transfer counter to effect resetting of the accrued deficit counter. The pulses from the pulse generator are applied through lead 204 through switch 38 to the selected decimal counter 36', which corresponds to the machine or operation which was responsible for the shutdown.

The pulses from pulse generator 210 are blocked by gate 213, the opening and closing of gate 213 being controlled by gate control flip-flop 209. As noted earlier, the leading edge of the pulse produced by the one shot multivibrator 207 opens gate 202 to allow transfer of the complement of the number stored in counter 201 to the counter 203. The trailing edge of this pulse is carried on lead 208 to gate control flip-flop 209 and is effective to turn gate control flip-flop 209 on. One output from gate control flip-flop 209 is used to open gate 213 while the other output from gate control flip-flop 209 is used to close gate 213. Thus, the trailing edge of the pulse produced by one shot multivibrator 207 is carried on lead 208 to turn gate control flip-flop 209 on which, through lead 211, opens gate 213 to allow the pulses from pulse generator 210 to be applied on lead 204. These pulses are counted both by the transfer counter 203 as well as the decimal counter 36 which is connected to lead 204 by switch 38'. As soon as the transfer counter is full, a reset pulse appears on reset line 204 and 204'. The reset pulse applied on line 204 is applied to accrued deficit counter 201 to reset this counter to its initial condition of zero count. At the same time, the reset pulse appears on conductor 204' and is applied to gate control flip-flop 209 to turn gate control flip-flop 209 off which, in its turn, closes gate 213. In this way, the selected one of counters 36' counts the number of pulses required to fill the transfer counter. Had there been a count already in one of counters 36', the additional incoming pulses would merely increase the count already existing in that counter.

Each counter circuit referred to above comprises a series of cascaded flip-flop circuits similar to the circuit shown in FIG. 9, with the respective terminals connected as shown in the block diagrams of the decade counter shown in FIG. 7 or the binary counter shown in FIG. 8. The flip-flop circuit shown in FIG. 9 is conventional and includes a pair of transistors Q1 and Q2 and RC cross-coupling networks 215 and 216. Steering circuits for each of the transistors comprises R1, C1 and D1 for transistor Q1 and resistor R2, capacitor C2 and diode D2 for transistor Q2.

This same flip-flop circuit is used as the gate control flip-flop 209 and, with minor modifications thereto, this circuit may be made to serve as the pulse generator 210.

Gate circuit 213 is shown in FIG. 10 and is conventional. This circuit employs a pair of transistors Q3 and Q4 with the emitter-collector circuits of each of the transistors serially connected. A control input is applied to the base of transistor Q4 so as to turn both transistors Q3 and Q4 on and thus allow a signal on the base of transistor Q3 to appear at the output terminal.

In the embodiments discussed hereinabove, the production line efficiency is determined by a comparison of the production line with its own immediate past performance. However, the invention is not limited thereto since the performance of the production line may be compared against any other production line as well as against established or standard production efficiency records for similar production lines.

It can be seen from the foregoing that there is provided in accordance with this invention apparatus for the evaluation of the efficiency of a production line which can be of great value to management. The apparatus of the invention provides a record of actual production and of potential production, as well as a comparison of actual production relative to potential production. The apparatus also provides a record of the units of potential production lost due to outages caused by various machines and operations in the production line. The apparatus of the invention can be used for evaluating the efficiency of any kind of production line operation, such as the assembly of radios, automobiles, or refrigerators, as well as the production line in a bottling plant, used as an illustrative example in describing the embodiment of the invention.

While there has been shown and described two embodiments of the invention, it will be obvious to those skilled in the art that various changes and modifications may be made without departing from the invention and, therefore, it is aimed to cover all such changes and modifications as fall within the true spirit and scope of the invention.

What I claim as my invention is:

1. An apparatus for evaluating production line efficiency comprising means for counting the number of units actually produced in a given period of time, means for counting potential production units, means synchronizing said potential production counting means with the actual rate of production during operation of the production line, said potential production counting means continuing in operation during non-operation of the production line to count non-produced potential production units, and means for comparing the actual and potential production units.

2. An apparatus for evaluating production line efficiency comprising means for counting the number of units actually produced in a given period of time, means for counting potential production units, means synchronizing said potential production counting means with the actual rate of production during operation of the production line, means for comparing the actual and potential production units, said potential production counting means continuing in operation during non-operation of the production line to count non-produced potential production units, a memory storage means for storing a record of non-produced production units, and means connecting said potential production counting means to said memory storage means during periods of non-operation of said production line whereby a record of non-produced production units are stored on said memory storage means.

3. An apparatus for evaluating production line efficiency comprising means for counting the number of units actually produced in a given period of time, means for counting potential production units, means synchronizing said potential production counting means with the actual rate of production during operation of the production line, means for comparing the actual and potential production units, said potential production-counting means continuing in operation during non-operation of the production line to count non-produced potential production units, a memory storage means for storing a record of non-produced production units, mean connecting said potential production counting means to said memory storage means during periods of non-operation of said production line whereby a record of non-produced production units are stored on said memory storage means, a plurality of registers each associated with a potential cause of non-production, and means for discharging the stored record on said memory means into a register corresponding to a given cause of non-production.

4. Apparatus for evaluating production line efficiency comprising means for producing a series of electrical signals corresponding to units of production passing through the production line, respectively, means for maintaining the production of said signals during periods of shutdown of the production line at the rate units were passing through the production line immediately preceding the shutdown period, memory means for storing the signals produced during each period of shutdown, a plurality of registers, each associated with a potential cause of shutdown, and means for discharging the stored signals from said memory means into a register corresponding to a given cause of non-production.

5. An apparatus for evaluating the efficiency of a production line comprising a potential production counting means, means for synchronizating the rate of operation of said potential production-counting means with the rate of the production being counted, said potential production counting means continuing operation during discontinuance of actual production, a second counting means for counting the lost potential production during a period of non-production, and means for connecting said potential production counting means to said second counting means during periods of non-production whereby the potential production lost during periods of non-production is counted by said second counting means.

6. An apparatus for evaluating the efficiency of a production line comprising counting means for counting the potential production of a production line, means synchronizing the rate of operation of said counting means with the rate of operation of said production line while said production line is in operation, said counting means continuing in operation during a shutdown of the production line to thereby count potential production lost during the shutdown, memory storage means for storing a record of the production units lost during a shutdown, and means for discharging the memory storage means at the end of the shutdown period.

7. An apparatus for evaluating the efficiency of a production line comprising counting means for counting the potential production of a production line, means synchronizing the rate of operation of said counting means with the rate of operation of said production line while said production line is in operation, said counting means continuing in operation during a shutdown of the production line to thereby count potential production lost during the shutdown, memory storage means for storing a record of the production units lost during a shutdown, a plurality of registers each respectively associated with a potential cause of a shutdown, and means for discharging the memory storage means at the end of a shutdown period into the register associated with the cause of the given shutdown.

8. Production line monitoring apparatus comprising, first memory means for storing the rate of production of the production line and producing signals corresponding thereto, second memory means for storing the signals produced by said first memory means during a period of non-production, third memory means, said third memory means including a plurality of registers, switch means for coupling said second memory means to one of said registers, and a programmer for controlling the operation of said second and third memory means.

9. Production line monitoring apparatus comprising first memory means for storing the rate of production of the production line and producing signals corresponding thereto, a second memory means, including a first multistage binary counter for counting and storing the signals produced by said first memory means during periods of production line shutdown, third memory means including a second multistage binary counter for storing the complement of the signals stored in said first binary counter, a gate circuit between corresponding stages of said counters for effecting transfer of the complement of the signals stored in said first counter to said second counter, control means for opening said gate circuits simultaneously to effect said transfer, means for supplying to said second counter the complement of the signals stored therein, and means for indicating the signals supplied to said second counter.

10. Apparatus as defined in claim 9 wherein said means for supplying signals to said second counter operates at a substantially higher rate than the rate stored in said first memory means.

11. Apparatus as defined in claim 9 including a further gate circuit between said means for supplying to said second counter the complement of the signals stored therein, and said second counter, switch means for opening said further gate circuit after the transfer between said counters, and means for applying the output from said second counter to said further gate circuit to close said further gate circuit.

12. Apparatus as defined in claim 9 wherein said means for indicating the signals supplied to said second counter includes a plurality of counting and indicating circuits, and means for selecting one of said circuits.

13. Apparatus as defined in claim 12 wherein each of said counting and indicating circuits operably integrate the total loss of production units over a period of at least more than one period of shutdown, for a given machine or operation in the production line.

14. A memory device comprising a threaded shaft, means for coupling said shaft for a given period of time to a driving shaft, a member threadably engaged with said shaft and moved longitudinally therealong, when said shaft is rotated, a distance proportional to the number of revolutions of said shaft, means for rotating said shaft to return said member to an initial position and means for counting the number of revolutions of said shaft when rotated by the last said means.

References Cited by the Examiner

UNITED STATES PATENTS

| | | | |
|---|---|---|---|
| 1,309,204 | 7/1919 | Koehler | 235—92 |
| 1,335,596 | 3/1920 | Morison | 235—92 |
| 1,339,381 | 5/1920 | Avram | 235—92 |
| 1,487,516 | 3/1924 | Heller | 346—124 |
| 1,687,281 | 10/1928 | Cooney | 235—92 |
| 2,159,915 | 5/1939 | Van Wagenen | 235—95 |
| 2,207,715 | 7/1940 | Bumstead | 235—92 |
| 2,469,655 | 5/1949 | Leathers | 235—92 |
| 2,646,924 | 7/1953 | Schuck | 235—187 |
| 2,770,150 | 11/1956 | Culverwell | 74—710 |
| 2,795,969 | 6/1957 | McCarthy | 74—710 |
| 2,853,235 | 9/1958 | Brinster et al. | 235—92 |
| 2,969,502 | 1/1961 | Andresen | 235—104 |
| 3,064,889 | 11/1962 | Hupp | 235—92 |
| 3,088,669 | 5/1963 | Sauer et al. | 235—187 |

MALCOLM A. MORRISON, *Primary Examiner.*